(12) United States Patent
Robinson et al.

(10) Patent No.: US 7,225,626 B2
(45) Date of Patent: Jun. 5, 2007

(54) THERMAL MANAGEMENT OF A GAS TURBINE BEARING COMPARTMENT UTILIZING SEPARATE LUBRICATION AND COOLING CIRCUITS

(75) Inventors: John D. Robinson, Scottsdale, AZ (US); Walter B. Smith, Higley, AZ (US); Richard Gockel, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 310 days.

(21) Appl. No.: 10/919,661

(22) Filed: Aug. 16, 2004

(65) Prior Publication Data
US 2006/0032261 A1    Feb. 16, 2006

(51) Int. Cl.
*F25B 31/00* (2006.01)
*F25B 39/04* (2006.01)
*F02G 3/00* (2006.01)
*F01M 5/00* (2006.01)

(52) U.S. Cl. .............................. 62/84; 62/192; 62/331; 60/39.08; 415/175; 184/6.11; 184/6.22

(58) Field of Classification Search .................. 62/84, 62/192, 331; 60/39.08; 415/175; 184/6.11, 184/6.22
See application file for complete search history.

(56) References Cited

U.S. PATENT DOCUMENTS

| | | | |
|---|---|---|---|
| 3,890,780 A | 6/1975 | Hagemeister | |
| 4,046,223 A | 9/1977 | McHugh | |
| 4,309,870 A * | 1/1982 | Guest et al. | ............... 60/39.08 |
| 4,451,200 A | 5/1984 | Libertini | |
| 4,465,427 A | 8/1984 | Libertini | |
| 4,891,934 A * | 1/1990 | Huelster | .................... 60/39.08 |
| 5,067,454 A | 11/1991 | Waddington | |
| 5,217,085 A * | 6/1993 | Barrie et al. | ............. 184/104.1 |
| 6,886,324 B1 * | 5/2005 | Handshuh et al. | ......... 60/39.08 |

* cited by examiner

*Primary Examiner*—Marc Norman
(74) *Attorney, Agent, or Firm*—Ingrassia Fisher & Lorenz

(57) ABSTRACT

A multiple path fluid circuit comprising a fluid reservoir and a fluid pump having an inlet in fluid communication with the fluid reservoir. The fluid pump may have an outlet in fluid communication with an inlet of a fluid cooling circuit. The fluid cooling circuit may then have an outlet in fluid communication with the fluid reservoir. The outlet of the fluid pump may also be in fluid communication with an inlet of a lubrication circuit, which may be in fluid communication with a delivery system capable of supplying a fluid to a moving component or to a component in contact with the moving component. A gas turbine engine comprising a multiple path fluid circuit is also disclosed as well as a method of utilizing a multiple path fluid circuit.

34 Claims, 4 Drawing Sheets

THERMAL MANAGEMENT OF A GAS TURBINE BEARING COMPARTMENT UTILIZING SEPARATE LUBRICATION AND COOLING CIRCUITS

BACKGROUND OF THE INVENTION

The present invention generally relates to apparatus and methods for accomplishing lubrication and cooling within a bearing compartment using separate fluid lubrication and cooling circuits. More specifically, the present invention relates to apparatus and methods relating to a multiple path fluid circuit comprising a lubrication fluid circuit and a cooling fluid circuit.

A fluid circuit for lubrication and cooling of certain components within an engine may include a fluid reservoir from which a lubrication fluid may be pumped by a fluid pump. The fluid pump may then deliver the fluid to a fluid circuit, which may include various conduits, annular passages, and the like which comprise a delivery means for the lubrication fluid, which may be used to deliver the pumped fluid to a moving component or to a component in contact with a moving component, which may require lubrication. Various moving components may be located within, or in fluid communication with, a bearing compartment having one or more fluid collection regions, or fluid sumps. Once the fluid exits the fluid delivery circuit and performs the required lubrication and cooling functions, (i.e., becomes spent fluid), it may then be collected in the fluid sump or sumps within the bearing compartment and returned to the reservoir through a scavenge circuit. The scavenge circuit may include various conduits, annular passages, fluid pumps, and the like which comprise a means for the spent fluid to be returned to the fluid reservoir. In some aspects, the energy to return the fluid to the reservoir is by means of a fluid pump, whereas in other aspects the energy is provided by the pressure within the bearing compartment, and may also include energy imparted to the fluid by the rotating components within the bearing compartment. The fluid may then be de-aerated, filtered, and cooled prior to re-use, either within the scavenge circuit, within the delivery portion of the circuit, or in any combination thereof.

Bearing compartments such as those in gas turbine engines may be located in engine sections that may be relatively hot compared to other sections of that same engine. Such bearing compartments may be referred to as hot section bearing compartments. Hot section bearing compartments may require provisions to moderate or cool the environment they may be in, in order to control the temperature of the air that leaks into the compartment, as well as the temperature of the internal oil-wetted walls of the compartment, and to facilitate the effectiveness of the oil introduced into the compartment to lubricate and cool various engine components within the bearing compartment. The temperature of the air that leaks into a hot section bearing compartment may be moderated by creating a buffer cavity that supplies the seals that seal the bearing compartment with air from a location of the engine, which may be cooler relative to the area where the hot section bearing compartment may be located. Examples of such cooler locations of a gas turbine engine may include a section where a compressor may be located. An additional means of controlling the thermal environment of a bearing compartment is to create a buffer cavity that completely surrounds the bearing compartment. To accomplish introduction of this cooling air into a buffer cavity surrounding a hot section bearing compartment, a region surrounding the buffer cavity may be vented to create a vent cavity wherein the pressure is reduced to a level below the pressure of the cooling air in the buffer cavity. Once the cooling air is introduced into the buffer cavity, it may leak into the hot section bearing compartment, and also leak into the vent cavity. Once in the vent cavity, the cooling air may be returned to the engine at some down stream location. As a result, multiple sets of air to air seals may be required to provide sealing between the buffer cavity and the vent cavity, and between the hot section environment and the vent cavity. In addition, cooling of a bearing compartment by introduction of cooling air around the compartment may result in an inefficiency to the engine due to the air lost by leakage into the bearing compartment, as well as through the addition of weight and complexity to the engine.

Regardless of whether or not the above described method for employing a buffer and vent cavity system is used, oil may be required within the bearing compartment to cool components within the compartment as well as to cool the internal oil-wetted walls of the compartment. In addition, oil may be required to lubricate surfaces of components within the bearing compartment that move relative to one another. To cool and to lubricate such internal components, a fluid (e.g., lubrication oil) may be supplied directly to a specific component via a lubrication fluid circuit with nozzles to control the quantity of fluid exiting the delivery passage and to direct the fluid to the appropriate location within the compartment. Once the fluid exits the lubrication fluid circuit (i.e., becomes unpressurized), it may come in contact with a surface or component and provide lubrication and cooling. Bearing compartment walls and other internal structures of the engine may also be cooled by splash action from the spent fluid. Once the fluid exits the fluid delivery circuit and performs the required lubrication and cooling functions, (i.e., becomes spent fluid), it may then be collected in the fluid sump or sumps within the bearing compartment and returned to the reservoir through a scavenge circuit.

In hot section bearing compartments, the amount of fluid needed for cooling may be greater than the amount of fluid that may be required for lubrication. Accordingly, if the spent fluid (e.g., oil) is not removed from the sump(s) within the compartment efficiently, churning of the fluid (i.e., energy added to the fluid by the rotating parts accompanied by increased aeration of the fluid) may result. Churning of spent fluid may result in heat generation, and may be detrimental to the sump and components located therein. Churning of spent fluid may also result in engine inefficiency, which may result in an engine being unable to meet a performance goal.

Also, lubrication systems may supply a fixed or predetermined amount of fluid flow to the various components and sumps regardless of an actual need dictated by engine operating conditions, or the condition of the lubrication system itself. Delivery of a fixed amount of fluid flow in excess of the flow required to achieve satisfactory lubrication and cooling may result in a lower efficiency of an engine.

Once an engine is shut down, the heat generated through operation of the engine may no longer be dissipated by systems which require the engine to be operating in order to function. Accordingly, various components may be subjected to temperatures brought about by so called "heat-soak", or "soak-back", wherein heat flows into previously cooler sections of an engine once the engine is shut down. Heat soak may result in degradation of various temperature sensitive components, including the lubrication fluid itself.

As such, heat soak may also adversely affect engine performance and component longevity.

As can be seen, there is a need for improved apparatus and methods for providing engine fluid lubrication and cooling in which the detriment to engine performance may be minimized, the various components of an engine are protected, and the effects of heat soak on the engine may be reduced.

SUMMARY OF THE INVENTION

In one aspect of the present invention, a multiple path fluid circuit comprises a fluid pump in fluid communication with a cooling circuit capable of supplying a fluid to provide cooling to an engine, and the fluid pump in fluid communication with a lubrication circuit capable of supplying the fluid to provide lubrication to the engine. In another aspect of the present invention, a multiple path fluid circuit comprises a fluid reservoir; a cooling fluid pump having a cooling fluid pump inlet in fluid communication with the fluid reservoir; the cooling fluid pump having a cooling fluid pump outlet in fluid communication with a fluid cooling circuit inlet of a fluid cooling circuit; the fluid cooling circuit also having a fluid cooling circuit outlet in fluid communication with the fluid reservoir; the multiple path fluid circuit further comprising a lubrication fluid pump having a lubrication fluid pump inlet in fluid communication with the fluid reservoir; the lubrication fluid pump having a lubrication fluid pump outlet in fluid communication with a lubrication circuit inlet of a lubrication circuit; and the lubrication circuit also having a lubrication circuit outlet capable of supplying a fluid to a moving component, or to a component in contact with the moving component.

In still another aspect of the present invention a multiple path fluid circuit comprises a fluid reservoir; an electric powered cooling fluid pump having a cooling fluid pump inlet in fluid communication with the fluid reservoir; the electric powered cooling fluid pump having a cooling fluid pump outlet in fluid communication with a fluid cooling circuit inlet of a fluid cooling circuit; the fluid cooling circuit also having a fluid cooling circuit outlet in fluid communication with the fluid reservoir; the multiple path fluid circuit further comprising an electric powered lubrication fluid pump having a lubrication fluid pump inlet in fluid communication with the fluid reservoir; the electric powered lubrication fluid pump having a lubrication fluid pump outlet in fluid communication with a lubrication circuit inlet of a lubrication circuit; the lubrication circuit also having a lubrication circuit outlet capable of supplying a fluid to a moving component, or to a component in contact with the moving component; wherein the lubrication circuit is in fluid communication with the fluid reservoir through a fluid sump; and the multiple path fluid circuit further comprising a flow controller capable of providing a cooling fluid pump flow rate control signal to the electric powered cooling fluid pump to control a cooling fluid flow rate, or the flow controller being capable of providing a lubrication fluid pump flow rate control signal to the electric powered lubrication fluid pump to control a lubrication fluid flow rate.

In yet another aspect of the present invention, a gas turbine engine comprises a multiple path fluid circuit; the multiple path fluid circuit comprising a fluid reservoir; an electric powered cooling fluid pump having a cooling fluid pump inlet in fluid communication with the fluid reservoir; the electric powered cooling fluid pump having a cooling fluid pump outlet in fluid communication with a fluid cooling circuit inlet of a fluid cooling circuit; the fluid cooling circuit also having a fluid cooling circuit outlet in fluid communication with the fluid reservoir; the multiple path fluid circuit further comprising an electric powered lubrication fluid pump having a lubrication fluid pump inlet in fluid communication with the fluid reservoir; the electric powered lubrication fluid pump having a lubrication fluid pump outlet in fluid communication with a lubrication circuit inlet of a lubrication circuit; the lubrication circuit also having a lubrication circuit outlet capable of supplying a fluid to a moving component, or to a component in contact with the moving component; wherein the lubrication circuit is in fluid communication with the fluid reservoir through a fluid sump; and the electric powered cooling fluid pump being capable of providing an amount of cooling fluid flow after the gas turbine engine has been shut off from operation.

In a further aspect of the present invention, a gas turbine engine comprises a multiple path fluid circuit; the multiple path fluid circuit comprising a fluid reservoir; an electric powered cooling fluid pump having a cooling fluid pump inlet in fluid communication with the fluid reservoir; the electric powered cooling fluid pump having a cooling fluid pump outlet in fluid communication with a fluid cooling circuit inlet of a fluid cooling circuit; the fluid cooling circuit also having a fluid cooling circuit outlet in fluid communication with the fluid reservoir; the multiple path fluid circuit further comprising an electric powered lubrication fluid pump having a lubrication fluid pump inlet in fluid communication with the fluid reservoir; the electric powered lubrication fluid pump having a lubrication fluid pump outlet in fluid communication with a lubrication circuit inlet of a lubrication circuit; the lubrication circuit also having a lubrication circuit outlet capable of supplying a fluid to a moving component, or to a component in contact with the moving component; wherein the lubrication circuit is in fluid communication with the fluid reservoir through a fluid sump; the multiple path fluid circuit further comprising a flow controller capable of providing a cooling fluid pump flow rate control signal to the electric powered cooling fluid pump to control a cooling fluid flow rate; the flow controller being capable of providing a lubrication fluid pump flow rate control signal to the electric powered lubrication fluid pump to control a lubrication fluid flow rate; and the electric powered cooling fluid pump being capable of providing an amount of cooling fluid flow after the gas turbine engine has been shut off from operation.

In yet a further aspect of the present invention, a method of cooling and lubricating a gas turbine engine comprises providing a cooling fluid flow to a fluid cooling circuit of a multiple path fluid circuit from a fluid pump; providing a lubrication fluid flow to a lubrication circuit of a multiple path fluid circuit from the fluid pump; wherein the multiple path fluid circuit comprises a fluid reservoir; the fluid pump having a fluid pump inlet in fluid communication with the fluid reservoir; the fluid pump having a fluid pump outlet in fluid communication with a fluid cooling circuit inlet of the fluid cooling circuit; the fluid cooling circuit having a fluid cooling circuit outlet in fluid communication with the fluid reservoir; the fluid pump outlet also being in fluid communication with a lubrication circuit inlet of the lubrication circuit; and the lubrication circuit having a lubrication circuit outlet in fluid communication with a delivery means capable of supplying a fluid to a moving component or to a component in contact with the moving component.

In still a further aspect of the present invention, a method of cooling and lubricating a gas turbine engine comprises providing a cooling fluid flow to a fluid cooling circuit of a multiple path fluid circuit from an electric cooling fluid pump; providing a lubrication fluid flow to a lubrication circuit of a multiple path fluid circuit from an electric lubrication fluid pump; wherein the multiple path fluid circuit comprises a fluid reservoir; the electric powered cooling fluid pump having a cooling fluid pump inlet in fluid communication with the fluid reservoir; the electric powered cooling fluid pump having a cooling fluid pump outlet in fluid communication with a fluid cooling circuit inlet of the fluid cooling circuit; the fluid cooling circuit also having a fluid cooling circuit outlet in fluid communication with the fluid reservoir; the multiple path fluid circuit further comprising the electric powered lubrication fluid pump having a lubrication fluid pump inlet in fluid communication with the fluid reservoir; the electric powered lubrication fluid pump having a lubrication fluid pump outlet in fluid communication with a lubrication circuit inlet of the lubrication circuit; the lubrication circuit also having a lubrication circuit outlet capable of supplying a fluid to a moving component, or to a component in contact with the moving component; wherein the lubrication circuit is in fluid communication with the fluid reservoir through a fluid sump; the multiple path fluid circuit further comprising a flow controller capable of providing a cooling fluid pump flow rate control signal to the electric powered cooling fluid pump to control a cooling fluid flow rate; the flow controller being capable of providing a lubrication fluid pump flow rate control signal to the electric powered lubrication fluid pump to control a lubrication fluid flow rate; and the electric powered cooling fluid pump being capable of providing an amount of cooling fluid flow after the gas turbine engine has been shut off from operation.

These and other features, aspects and advantages of the present invention will become better understood with reference to the following drawings, description and claims.

DETAILED DESCRIPTION OF THE INVENTION

Figure 1:
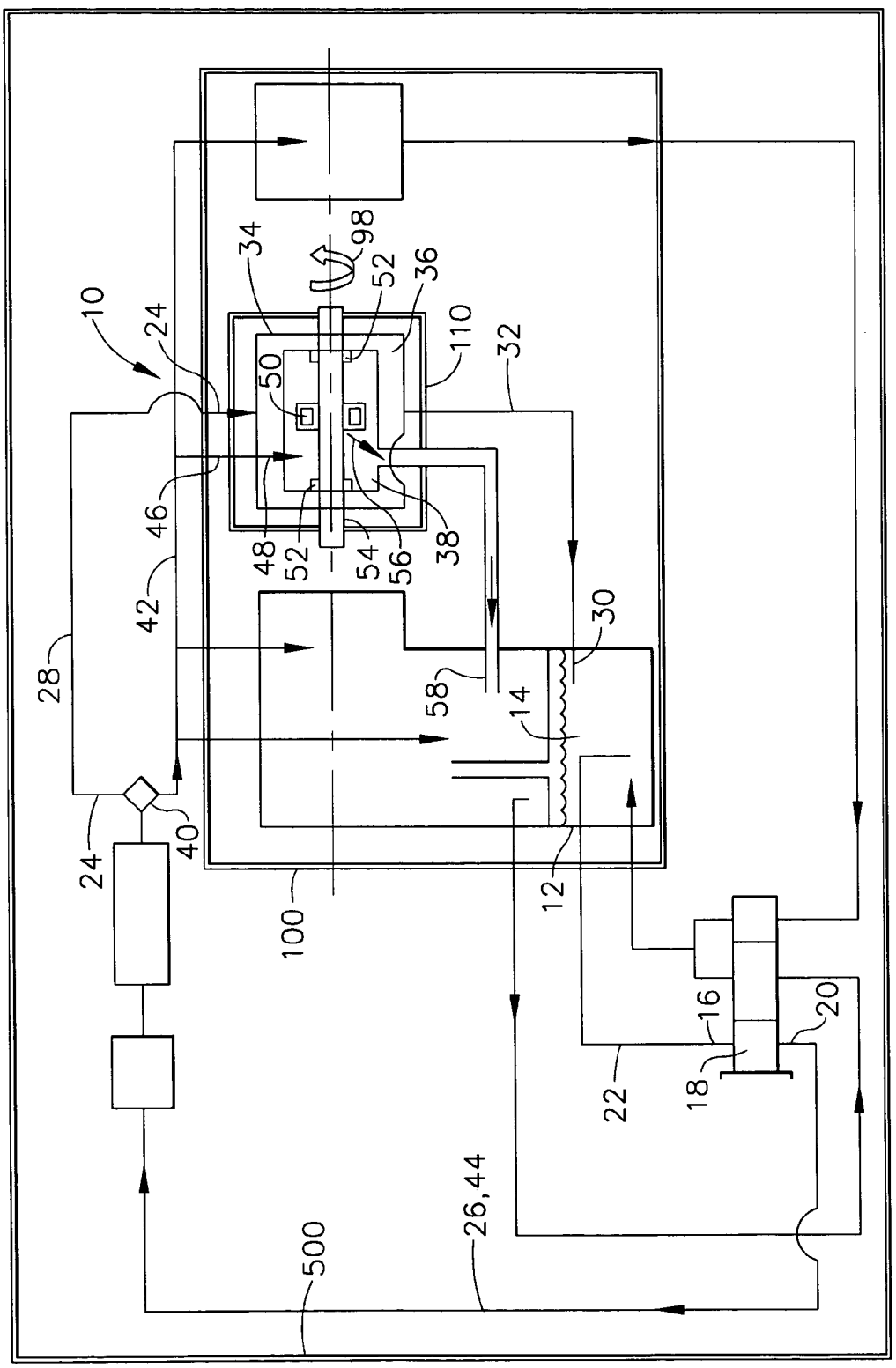
FIG. 1 is a schematic view of a portion of a gas turbine engine comprising a multiple path fluid circuit of the present invention within a bearing compartment.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention generally provides a multiple path fluid circuit in which one of the fluid circuits may provide cooling to various components of an engine such as a gas turbine engine, and in which another fluid circuit may provide lubrication to various components of an engine. This is in contrast to the prior art, wherein a single fluid circuit may provide both cooling and lubrication to the various components of a gas turbine engine.

The multiple path fluid circuit for lubrication and cooling of an engine may include a fluid reservoir from which a fluid may be pumped by a fluid pump. The fluid pump may then deliver the fluid to a lubrication circuit, which may include various conduits, annular passages, and the like which comprise a delivery system for the lubrication fluid, which may be used to deliver the pumped fluid to a moving component or to a component in contact with a moving component that may require lubrication. Various moving components may be located within, or in fluid communication with, a fluid sump. Once the fluid exits the lubrication circuit and performs the required lubrication functions, (i.e., becomes spent fluid), it may then be collected in the fluid sump or sumps within the bearing compartment and returned to the reservoir through a scavenge circuit. The lubrication fluid scavenge circuit may include various conduits, annular passages, fluid pumps, and the like which comprise a means for the spent fluid to be returned to the fluid reservoir. In some aspects, the energy to return the fluid to the reservoir is by means of a fluid pump, whereas in other aspects the energy is provided by the pressure within the bearing compartment, and may also include energy imparted to the fluid by the rotating components within the bearing compartment. The fluid may then be de-aerated, filtered, and cooled prior to re-use, either within the scavenge circuit, within the delivery portion of the circuit, or in any combination thereof.

In a multiple path fluid circuit, a fluid may be pumped by a fluid pump from the same fluid reservoir and delivered to a separate, cooling circuit, which may include various conduits, annular passages, and the like which comprise a delivery system for the lubrication fluid, which may be used, for example, to deliver the pumped fluid to the bearing compartment. In an embodiment, the fluid delivered to the bearing compartment in the separate cooling fluid circuit may not enter the bearing compartment, nor come in contact with any moving components within the bearing compartment, but rather may be constrained within passages to allow a direct return to the reservoir and thus provide a cooling function to the engine. This is in contrast to the prior art, wherein the fluid entered the bearing compartment and was exposed to moving components within the engine.

The present invention may include multiple fluid pumps for providing fluid to multiple fluid circuits. Each of the multiple fluid pumps may draw a fluid from the same reservoir, and may deliver the fluid to one of multiple fluid circuits. The rate of flow a particular fluid pump may be different from a rate of flow of another particular fluid pump, depending on which fluid circuit the particular fluid pump delivers fluid to. This is in contrast to the prior art, wherein a single fluid pump may be used to deliver a particular fluid flow to a single fluid circuit.

In addition, the present invention may include multiple electric fluid pumps, each of which may deliver fluid to one of multiple fluid circuits. The flow rate of each of the multiple electric fluid pumps may also be controlled depending on various inputs determined by the operational environment of the engine. This is in contrast to the prior art, wherein the flow rate of a single pump may be constant, regardless of the operational environment of the engine. The present invention may also be utilized within a self compensating flow control lubrication system comprising one or more valves, as described in U.S. Pat. No. 5,067,454, which is fully incorporated by reference herein.

Further, the present invention may include multiple electric fluid pumps, each of which may continue to provide fluid to a fluid circuit for a period of time after the engine is shut down. Thus, the present invention may mitigate or even eliminate detrimental effects of heat soak. This is in contrast to the prior art, wherein once an engine is shut down, the single fluid pump will cease to provide fluid to a fluid circuit.

In more specifically describing the present invention, FIG. 1 shows a sectional view of a gas turbine engine 100 having a lubrication system represented generally as 500, and having a multiple path fluid circuit of the present invention, represented generally as 10 disposed within an engine bearing compartment 110. Details of the multiple path circuits within a bearing compartment are shown in FIGS. 1–3.

FIG. 1 shows a multiple path fluid circuit 10 which may comprise a fluid reservoir 12 which may contain a fluid 14. Fluid reservoir 12 may be in fluid communication with a fluid pump inlet 16 of a fluid pump 18 via a conduit 22. Fluid pump 18 may also have a fluid pump outlet 20 in fluid communication with a fluid cooling circuit inlet 24 of a fluid cooling circuit 28 via a conduit 26. Fluid cooling circuit 28 may include various fluid channels 34 disposed within engine bearing compartment 110. For example, within a bearing compartment housing 36, which may be arranged around a fluid sump 38. Fluid cooling circuit 28 may also include a fluid cooling circuit outlet 30 in fluid communication with fluid reservoir 12, by a conduit 32. Accordingly, fluid cooling circuit 28 may include a continuous loop comprising reservoir 12, fluid pump inlet 16, fluid pump 18, fluid pump outlet 20, fluid cooling circuit inlet 24, fluid channels 34, fluid cooling circuit outlet 30 and various conduits 22, 26, and 32. In an embodiment, fluid cooling circuit 28 may be a continuous loop which does not include fluid sump 38.

Fluid pump outlet 20 may also be in fluid communication with a lubrication circuit inlet 40 of a lubrication circuit 42 by a conduit 44. Lubrication circuit 42 may include one or more lubrication conduits 46, which may have one or more lubrication circuit outlets 48 which may be capable of supplying fluid 14 to a moving component shown in FIG. 1 such as a bearing 50, and/or a rotating shaft 54. Lubrication circuit outlets 48 may also be capable of supplying fluid 14 to a component in contact with a moving component, such as a bearing compartment seal 52, a gear (51), a spline (53), and/or the like. As shown In FIG. 1, spent fluid 56 may then drain into fluid sump 38, and be collected and drain back into fluid reservoir 12 via a return conduit 58. Accordingly, referring again to FIG. 1, lubrication circuit 42 may include an open loop comprising reservoir 12, fluid pump inlet 16, fluid pump 18, fluid pump outlet 20, lubrication circuit inlet 40, lubrication conduits 46, and lubrication circuit outlets 48. Fluid 14 emanating from the open loop formed by lubrication circuit 42 may then drain into sump 38 prior to being returned to reservoir 12. As such, lubrication circuit 42 may be in fluid communication with fluid reservoir 12 through fluid sump 38.

Figure 2:
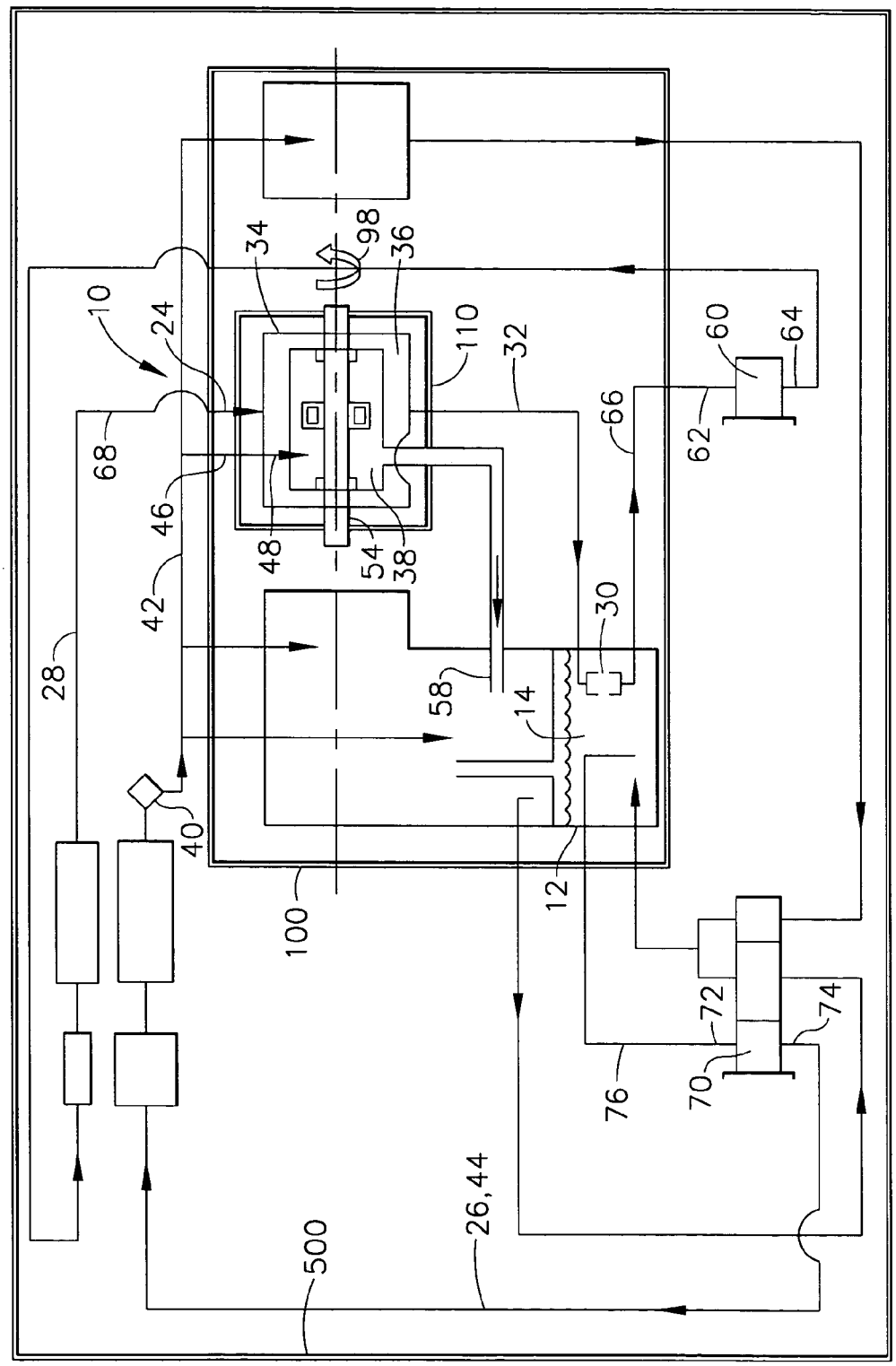
FIG. 2 is a schematic view of a portion of a gas turbine engine comprising a multiple path fluid circuit showing a fluid pump in fluid communication with a lubrication flow circuit and a separate pump in fluid communication with a cooling flow circuit of the present invention within a bearing compartment.
Figure 3:
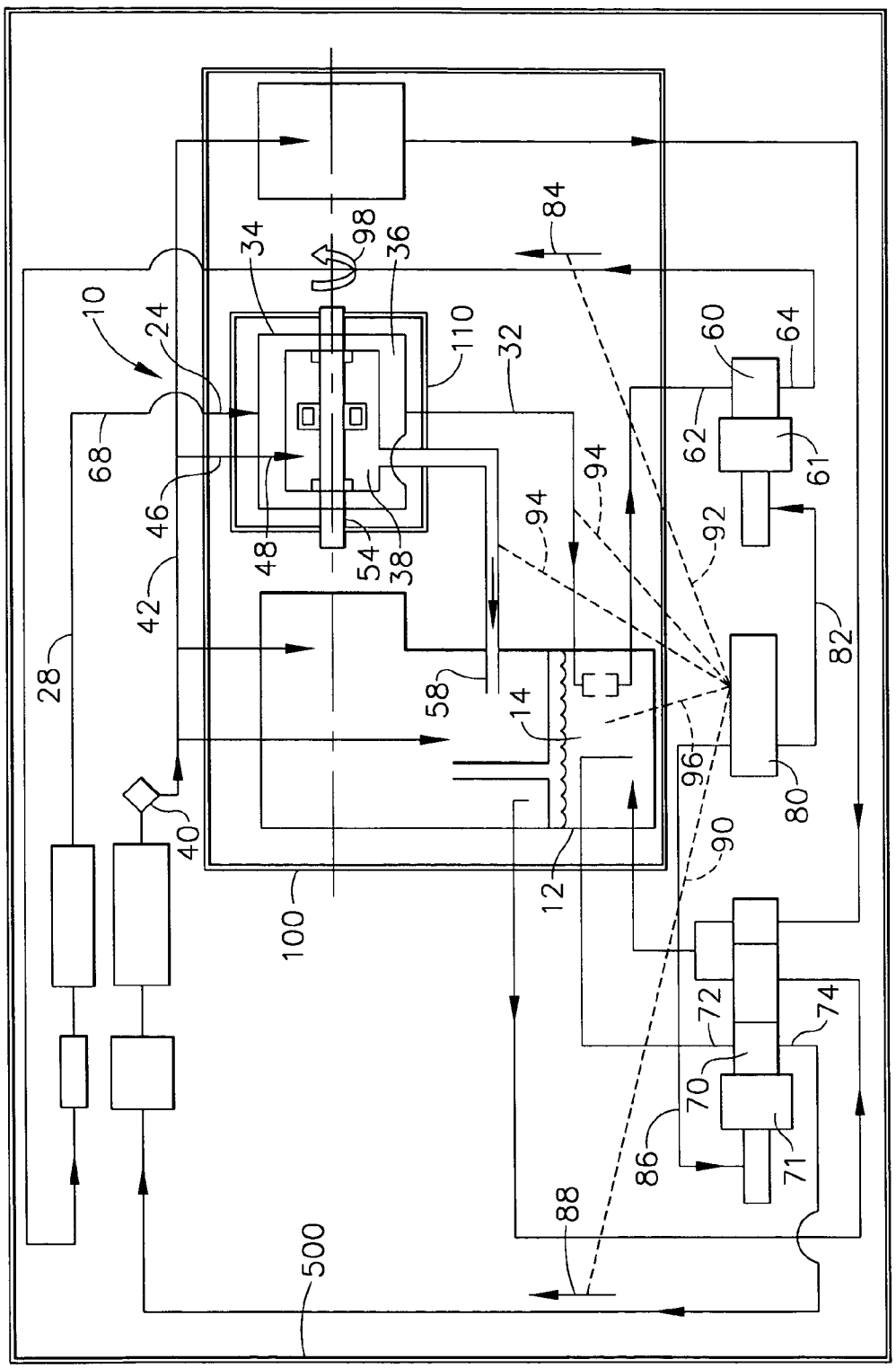
FIG. 3 is a schematic view of a portion of a gas turbine engine comprising a multiple path fluid circuit showing a fluid pump in fluid communication with a lubrication flow circuit and a separate pump in fluid communication with a cooling flow circuit of the present invention within a bearing compartment.

As shown in FIG. 2, multiple path fluid circuit 10 may include fluid reservoir 12, which may be in fluid communication with a cooling fluid pump 60, having a cooling fluid pump inlet 62 via a supply conduit 66. Cooling fluid pump 60 may also have a cooling fluid pump outlet 64 in fluid communication with fluid cooling circuit inlet 24 via delivery conduit 68. As described above, cooling fluid circuit 28 may also have fluid cooling circuit outlet 30 in fluid communication with fluid reservoir 12 via conduit 32. Multiple path fluid circuit 10 may also include a lubrication fluid pump 70 having a lubrication fluid pump inlet 72 in fluid communication with fluid reservoir 12 via a conduit 76. Lubrication fluid pump 70 may also have a lubrication fluid pump outlet 74 in fluid communication with lubrication circuit inlet 40 of lubrication circuit 42.

As shown in FIG. 3, multiple path fluid circuit 10 may also include a flow controller 80 which may provide control over a cooling fluid flow rate 84, and/or lubrication fluid flow rate, 88. In an embodiment, flow controller 80 may provide a cooling fluid pump flow rate control signal 82 to cooling fluid pump 60 in the form of an electrical signal to electric motor 61 (electrical signals being represented in FIG. 8 by dotted lines). Flow controller 80 may also provide a lubrication fluid pump flow rate control signal 86 to lubrication fluid pump 70 via an electrical signal to electric motor 71. Flow controller 80 may base control of cooling fluid flow rate 84 and/or lubrication fluid flow rate 88 on various inputs from a lubrication fluid flow rate sensor 90, an output from a cooling fluid flow rate sensor 92, one or more temperature sensors 94, a fluid level sensor 96, rotating shaft RPM (not shown), or the like. As such, lubrication fluid flow rate 88 may be held constant and cooling fluid flow rate 84 may be varied depending on various outputs.

In an embodiment, fluid pump 18 (see FIG. 1), may be driven by an electric motor (i.e., a fluid pump powered by electricity). In other embodiments, (see FIG. 3), cooling fluid pump 60 may be an electric cooling fluid pump, and/or lubrication fluid pump 70 may be an electric lubrication fluid pump. Cooling fluid pump 60 may also be capable of providing cooling fluid flow rate 84 which may be variable (i.e., a variable flow electric pump), and/or lubrication fluid pump 70 may be capable of providing lubrication fluid flow rate 88 which may be variable (i.e., a variable flow electric pump).

As shown in FIG. 3, multiple path fluid circuit 10 of the present invention may be disposed within gas turbine engine housing 36 such that rotating shaft 54 has a rotation 98 while gas turbine engine 100 may be in operation. Cooling fluid pump 60 may be capable of providing an amount of cooling fluid flow rate 84 after gas turbine engine 100 has been shut down (i.e., after the gas turbine engine 100 is no longer in operation and rotation 98 of rotatable shaft 54 has ceased). Such a cooling fluid flow rate 84 (i.e., a cooling fluid flow) may thus serve to provide cooling to the various components of gas turbine engine 100 which may be at an elevated temperature relative to an ambient environment (not shown) due to previous operation of gas turbine engine 100, and thus prevent or lessen possible detrimental effects of heat soak. Cooling fluid pump 60 may receive electrical energy from a battery (not shown), or other power supply to continue operation after gas turbine engine 100 has been shut down.

In an embodiment, such as shown in FIG. 3, cooling fluid flow rate 84 may be greater than or equal to lubrication fluid flow rate 88. A ratio of cooling fluid flow rate 84 to a lubrication fluid flow rate 88 may be at least about 20:1. In still another embodiment, the ratio of cooling fluid flow rate 84 to a lubrication fluid flow rate 88 may be at least about 10:1. In still another embodiment, the ratio of cooling fluid flow rate 84 to a lubrication fluid flow rate 88 may be at least about 5:1. In still another embodiment, the ratio of cooling fluid flow rate 84 to a lubrication fluid flow rate 88 may be at least about 2:1. In still another embodiment, the flow rate ratio of cooling fluid flow rate 84 to a lubrication fluid flow rate 88 may be at least about 1:1. In addition, fluid 14 may be an oil, such as lubrication oil suitable for use in gas turbine engine 100.

The use of various lubrication oils for fluid 14 may require maintaining temperatures of fluid 14 at or below about 425° F. to prevent fluid 14 from thermal degradation. Accordingly, in an embodiment, multiple path fluid circuit 10 may have cooling fluid flow rate 84 capable of maintaining a fluid temperature of fluid 14 in fluid reservoir 12 at or below about 425° F. during operation of the engine in which multiple path fluid circuit 10 may be located, for example, gas turbine engine 100. In another embodiment, multiple path fluid circuit 10 may have cooling fluid flow rate 84 capable of maintaining a fluid temperature of fluid 14 in fluid sump 38 at or below about 425° F. during operation of the engine in which multiple path fluid circuit 10 may be located, for example, gas turbine engine 100.

Figure 4:
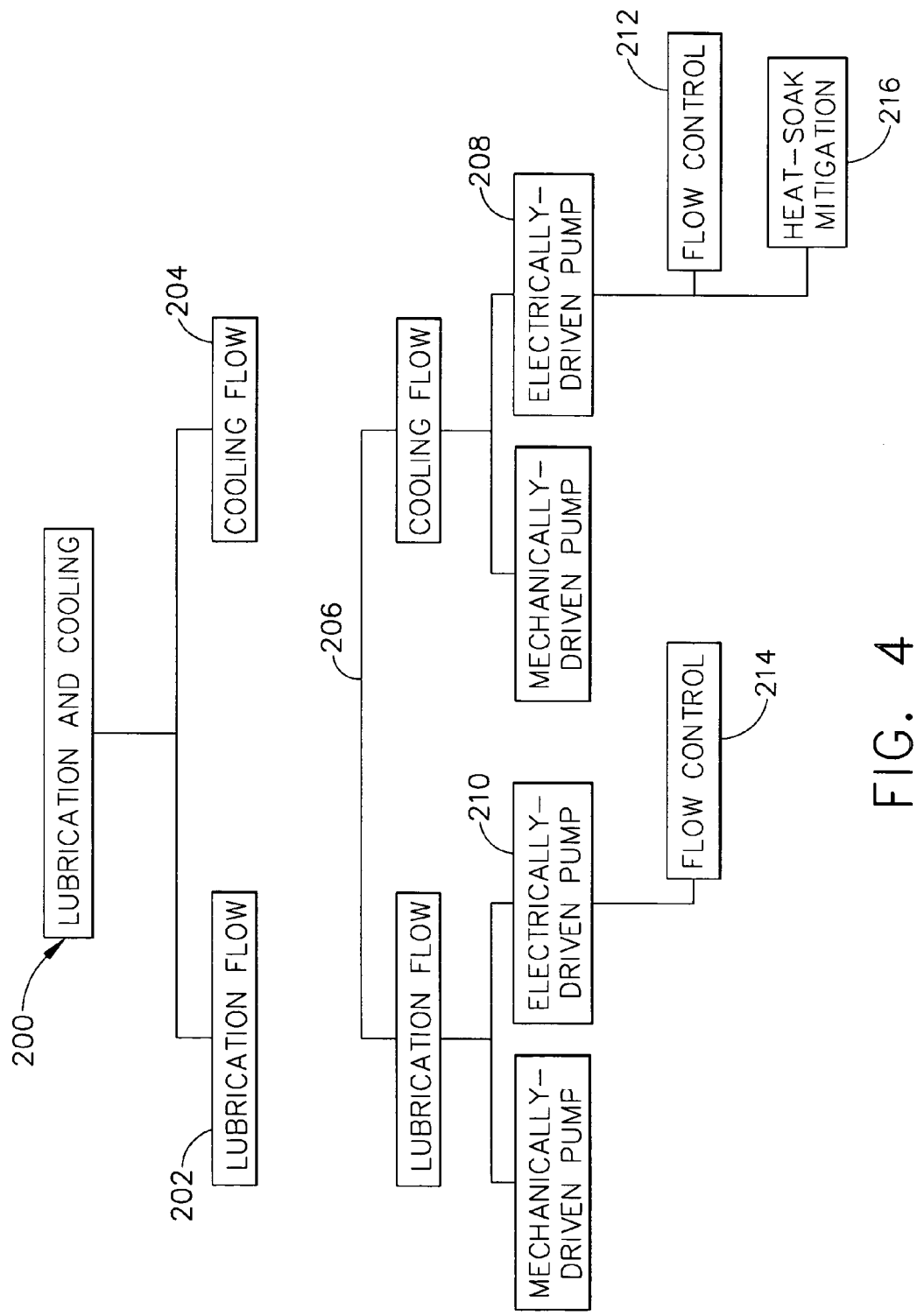
FIG. 4 is a flow chart showing the steps of alternative methods of the present invention.

In an embodiment, (see FIG. 4) a lubrication/cooling method 200 to provide lubrication and cooling to gas turbine engine 100 may include a lubrication flow step 202, wherein a lubrication fluid flow may be provided to a fluid lubrication circuit of a multiple path fluid circuit from a fluid pump; and/or a cooling flow step 204, wherein a cooling fluid flow may be provided to a cooling circuit of a multiple path fluid circuit from the fluid pump.

In another embodiment, an alternative lubrication/cooling method 206 to provide lubrication and cooling to gas turbine engine 100 may include electric pump cooling flow step 208, wherein the cooling fluid flow may be provided to a fluid cooling circuit of a multiple path fluid circuit from an electric cooling fluid pump. Method 206 may also include an electric pump lubrication flow step 210, wherein the lubrication fluid flow may be provided to a lubrication circuit of a multiple path fluid circuit from an electric lubrication fluid pump. Method 206 may further comprise a cooling flow rate control step 212, wherein the cooling fluid flow rate may be controlled via a cooling fluid pump flow rate control signal provided to the electric powered cooling fluid pump; and/or a lubrication flow rate control step 214, which may include controlling the lubrication fluid flow rate by providing a lubrication fluid pump flow rate control signal to the electric powered lubrication fluid pump. Method 206 may still further comprise a heat soak mitigation step 216, wherein an amount of cooling fluid flow may be provided to the fluid cooling circuit of a multiple path fluid circuit of a gas turbine engine after the gas turbine engine has been shut off from operation.

It should be understood, of course, that the foregoing relates to exemplary embodiments of the invention and that modifications may be made without departing from the spirit and scope of the invention as set forth in the following claims.

We claim:

1. A multiple path fluid circuit comprising:
a fluid pump in fluid communication with a cooling circuit capable of supplying a fluid to provide cooling to an engine, and said fluid pump in fluid communication with a lubrication circuit capable of supplying said fluid to provide lubrication to said engine,
wherein said lubrication circuit is not in fluid communication with said cooling circuit except through a fluid reservoir and said fluid pump, and
wherein said lubrication circuit comprises an open loop, which directs said fluid into a fluid sump to produce spent fluid, wherein said spent fluid is collected in said fluid sump and returned to said fluid reservoir.

2. The multiple path fluid circuit of claim 1, wherein said fluid pump is an electric pump.

3. The multiple path fluid circuit of claim 1, further comprising a fluid reservoir in fluid communication with said fluid pump, said cooling circuit, and said lubrication circuit.

4. The multiple path fluid circuit of claim 1, wherein said cooling circuit comprises one or more conduits disposed within one or more walls surrounding a fluid sump.

5. The multiple path fluid circuit of claim 4, wherein said cooling circuit comprises a continuous loop which does not include said fluid sump.

6. The multiple path fluid circuit of claim 1, wherein a flow rate ratio of a cooling fluid flow rate to a lubrication fluid flow rate is at least about 20:1.

7. The multiple path fluid circuit of claim 6, wherein said flow rate ratio is at least about 10:1.

8. The multiple path fluid circuit of claim 6, wherein said flow rate ratio is at least about 5:1.

9. The multiple pat fluid circuit of claim 6, wherein said flow rate ratio is at least about 2:1.

10. The multiple path fluid circuit of claim 6, wherein said flow rate ratio is at least about 1:1.

11. The multiple path fluid circuit of claim 1, wherein said fluid is a lubrication oil.

12. The multiple path fluid circuit of claim 1, wherein said lubrication circuit provided lubrication to a bearing, a bearing seal, a gear, a spline, or a combination thereof.

13. A multiple path fluid circuit comprising:
a fluid reservoir;
a cooling fluid pump having a cooling fluid pump inlet in fluid communication with said fluid reservoir;
said cooling fluid pump having a cooling fluid pump outlet in fluid communication with a fluid cooling circuit inlet of a fluid cooling circuit; said fluid cooling circuit also having a fluid cooling circuit outlet in fluid communication with said fluid reservoir;
said multiple path fluid circuit further comprising a lubrication fluid pump having a lubrication fluid pump inlet in fluid communication with said fluid reservoir;
said lubrication fluid pump having a lubrication fluid pump outlet in fluid communication with a lubrication circuit inlet of a lubrication circuit; and said lubrication circuit also having a lubrication circuit outlet capable of supplying a fluid to a moving component, or to a component in contact with said moving component,
wherein said lubrication circuit is not in fluid communication with said cooling circuit except through a fluid reservoir and said fluid pump, and
wherein said lubrication circuit comprises an open loop, which directs said fluid into a fluid sump to produce spent fluid, wherein said spent fluid is collected in said fluid sump and returned to said fluid reservoir.

14. The multiple path fluid circuit of claim 13, wherein said cooling fluid pump or said lubrication fluid pump is an electric pump.

15. The multiple path fluid circuit of claim 13, wherein both said cooling fluid pump and said lubrication fluid pump are electric pumps.

16. The multiple path fluid circuit of claim 13, wherein said cooling fluid pump or said lubrication fluid pump is a variable flow electric pump.

17. The multiple path fluid circuit of claim 13, wherein both said cooling fluid pump and said lubrication fluid pump are variable flow electric pumps.

18. The multiple path fluid circuit of claim 13, wherein a flow rate of said cooling fluid pump is at least about 20 times a flow rate of said lubrication fluid pump.

19. The multiple path fluid circuit of claim 13, wherein a flow rate of said cooling fluid pump is at least about 2 times a flow rate of said lubrication fluid pump.

20. The multiple path fluid circuit of claim 13, wherein a flow rate of said cooling fluid pump is greater than or equal to a flow rate of said lubrication fluid pump.

21. A multiple path fluid circuit comprising:
a fluid reservoir;
an electric powered waling fluid pump having a waling fluid pump inlet in fluid communication with said fluid reservoir;
said electric powered waling fluid pump having a cooling fluid pump outlet in fluid communication with a fluid cooling circuit inlet of a fluid cooling circuit;
said fluid cooling circuit also having a fluid cooling circuit outlet in fluid communication with said fluid reservoir;
said multiple path fluid circuit further comprising an electric powered lubrication fluid pump having a lubrication fluid pump inlet in fluid communication with said fluid reservoir; said electric powered lubrication fluid pump having a lubrication fluid pump outlet in fluid communication with a lubrication circuit inlet of a lubrication circuit;
said lubrication circuit also having a lubrication circuit outlet capable of supplying a fluid to a moving component, or to a component in contact with said moving component; said lubrication circuit having a sump or sumps within the bearing compartment for collection of the spent lubrication fluid, and conduits for return of the lubrication fluid to the reservoir through a scavenge circuit, wherein said lubrication circuit is in fluid communication with said fluid reservoir through a fluid sump; and
said multiple path fluid circuit further comprising a flow controller capable of providing a cooling fluid pump flow rate control signal to said electric powered cooling fluid pump to control a cooling fluid flow rate, or said flow controller being capable of providing a lubrication fluid pump flow rate control signal to said electric powered lubrication fluid pump to control a lubrication fluid flow rate.

22. The multiple path fluid circuit of claim 21, further comprising one or more temperature sensors, one or more cooling fluid flow rate sensors, one or more lubrication fluid flow rate sensors, or one or more fluid level sensors in electrical communication with said flow controller.

23. The multiple path fluid circuit of claim 21, wherein said flow controller is capable of providing said cooling fluid pump flow rate control signal to said electric powered cooling fluid pump to control said cooling fluid flow rate, and wherein said flow control is capable of providing said lubrication fluid pump flow rate control signal to said electric powered lubrication fluid pump to control said lubrication fluid flow rate.

24. The multiple path fluid circuit of claim 21, further comprising one or more temperature sensors, one or more cooling fluid flow rate sensors, one or more lubrication fluid flow rate sensors, and one or more fluid level sensors in electrical communication with said flow controller.

25. The multiple path fluid circuit of claim 21, having a cooling fluid flow rate capable of maintaining a fluid temperature of said fluid in said fluid reservoir at about 425° F. or less during operation of a gas turbine engine comprising said multiple path fluid circuit.

26. The multiple path fluid circuit of claim 21, having a cooling fluid flow rate capable of maintaining a fluid temperature of said fluid in said fluid sump at about 425° F. or less during operation of a gas turbine engine comprising said multiple path fluid circuit.

27. A gas turbine engine comprising:
a multiple path fluid circuit; said multiple pat fluid circuit comprising:
a fluid reservoir; an electric powered cooling fluid pump having a cooling fluid pump inlet in fluid communication with said fluid reservoir;
said electric powered cooling fluid pump having a cooling fluid pump outlet in fluid communication with a fluid cooling circuit inlet of a fluid cooling circuit;
said fluid cooling circuit also having a fluid cooling circuit outlet in fluid communication with said fluid reservoir; said multiple path fluid circuit further comprising an electric powered lubrication fluid pump having a lubrication fluid pump inlet in fluid communication with said fluid reservoir,
said electric powered lubrication fluid pump having a lubrication fluid pump outlet in fluid communication with a lubrication circuit inlet of a lubrication circuit;
said lubrication circuit also having a lubrication circuit outlet capable of supplying a fluid to a moving component, or to a component in contact with said moving component; wherein said lubrication circuit is in fluid communication with said fluid reservoir through a fluid sump,
wherein said lubrication circuit is not in fluid communication with said cooling circuit except through a fluid reservoir and said fluid pump, and wherein said lubrication circuit comprises an open loop, which directs said fluid into a fluid sump to produce spent fluid, wherein said spent fluid is collected in said fluid sump and returned to said fluid reservoir; and
said electric powered cooling fluid pump being capable of providing an amount of cooling fluid flow after said gas turbine engine has been shut off from operation.

28. The gas turbine engine of claim 27, wherein said electric powered lubrication fluid pump is capable of providing an amount of lubrication fluid flow alter said gas turbine engine has been shut off from operation.

29. A gas turbine engine comprising a multiple path fluid circuit; said multiple path fluid circuit comprising:
a fluid reservoir; an electric powered cooling fluid pump having a cooling fluid pump inlet in fluid communication with said fluid reservoir;
said electric powered cooling fluid pump having a cooling fluid pump outlet in fluid communication with a fluid cooling circuit inlet of a fluid cooling circuit;
said fluid cooling circuit also having a fluid cooling circuit outlet in fluid communication with said fluid reservoir;
said multiple pat fluid circuit further comprising an electric powered lubrication fluid pump having a lubrication fluid pump inlet in fluid communication with said fluid reservoir; said electric powered lubrication fluid pump having a lubrication fluid pump outlet in fluid communication with a lubrication circuit inlet of a lubrication circuit;
said lubrication circuit also having a lubrication circuit outlet capable of supplying a fluid to a moving component, or to a component in contact with said moving component;
said lubrication circuit having a fluid sump or sumps within the bearing compartment for collection of the spent lubrication fluid, and conduits for return of the lubrication fluid to the reservoir through a scavenge circuit, wherein said lubrication circuit is in fluid communication with said fluid reservoir through a fluid sump;

said multiple path fluid circuit further comprising a flow controller capable of providing a cooling fluid pump flow rate control signal to said electric powered cooling fluid pump to control a cooling fluid flow rate; said flow controller capable of providing a lubrication fluid pump flow rate control signal to said electric powered lubrication fluid pump to control a lubrication fluid flow rate; and said electric powered cooling fluid pump capable of providing an amount of cooling fluid flow after said gas turbine engine has been shut off from operation.

30. A method for simultaneously cooling and lubricating a gas turbine engine, comprising:

simultaneously providing a cooling fluid flow to a fluid cooling circuit of a multiple path fluid circuit from a fluid pump, and providing a lubrication fluid flow to a lubrication circuit of a multiple path fluid circuit from said fluid pump;

wherein said multiple path fluid circuit comprises: a fluid reservoir; said fluid pump having a fluid pump inlet in fluid communication with said fluid reservoir, said fluid pump having a fluid pump outlet in fluid communication with a fluid cooling circuit inlet of said fluid cooling circuit; said fluid cooling circuit having a fluid cooling circuit outlet in fluid communication with said fluid reservoir; said fluid pump outlet also being in fluid communication with a lubrication circuit inlet of said lubrication circuit and said lubrication circuit having a lubrication circuit outlet in fluid communication with a delivery system capable of supplying a fluid to a moving component or to a component in contact with said moving component, wherein said lubrication circuit is not in fluid communication with said cooling circuit except through a fluid reservoir and said fluid pump, and wherein said lubrication circuit comprises an open loop, which directs said fluid into a fluid sump to produce spent fluid, wherein said spent fluid is collected in said fluid sump and returned to said fluid reservoir.

31. A method of cooling and lubricating a gas turbine engine, comprising:

providing a cooling fluid flow to a fluid cooling circuit of a multiple path fluid circuit from an electric cooling fluid pump;

providing a lubrication fluid flow to a lubrication circuit of a multiple path fluid circuit from an electric lubrication fluid pump; wherein said multiple path fluid circuit comprises: a fluid reservoir; said electric powered cooling fluid pump having a cooling fluid pump inlet in fluid communication with said fluid reservoir; said electric powered cooling fluid pump having a cooling fluid pump outlet in fluid communication with a fluid cooling circuit inlet of said fluid cooling circuit; said fluid cooling circuit also having a fluid cooling circuit outlet in fluid communication with said fluid reservoir; said multiple path fluid circuit further comprising said electric powered lubrication fluid pump having a lubrication fluid pump inlet in fluid communication with said fluid reservoir; said electric powered lubrication fluid pump having a lubrication fluid pump outlet in fluid communication with a lubrication circuit inlet of said lubrication circuit; said lubrication circuit also having a lubrication circuit outlet capable of supplying a fluid to a moving component, or to a component in contact with said moving component; said lubrication circuit having a fluid sump or sumps within the bearing compartment for collection of the spent lubrication fluid, and conduits for return of the lubrication fluid to the reservoir through a scavenge circuit, wherein said lubrication circuit is in fluid communication with said fluid reservoir through a fluid sump; said multiple path fluid circuit further comprising a flow controller capable of providing a cooling fluid pump flow rate control signal to said electric powered cooling fluid pump to control a cooling fluid flow rate; said flow controller being capable of providing a lubrication fluid pump flow rate control signal to said electric powered lubrication fluid pump to control a lubrication fluid flow rate; and said electric powered cooling fluid pump being capable of providing an amount of cooling fluid flow after said gas turbine engine has been shut off from operation.

32. The method of claim 31, further comprising the step of providing an amount of cooling fluid flow after said gas turbine engine has been shut off from operation.

33. The method of claim 31, further comprising the step of controlling said cooling fluid flow rate by providing said cooling fluid pump flow rate control signal, a temperature sensor signal, or both to said electric powered cooling fluid pump.

34. The method of claim 31, further comprising the step of controlling said lubrication fluid flow rate by providing said lubrication fluid pump flow rate control signal to said electric powered lubrication fluid pump.

* * * * *